(12) United States Patent
Lynch-Branzoi et al.

(10) Patent No.: US 12,398,247 B2
(45) Date of Patent: Aug. 26, 2025

(54) CONDUCTIVE POLYMER NANOCOMPOSITES ENHANCED WITH IN SITU FORMATION OF 2D NANOPARTICLES FOR STRUCTURAL SENSORS AND SMART MATERIALS

(71) Applicant: Rutgers, The State University of New Jersey, New Brunswick, NJ (US)

(72) Inventors: Jennifer K. Lynch-Branzoi, Belle Mead, NJ (US); Ali Ashraf, Paterson, NJ (US)

(73) Assignee: RUTGERS, THE STATE UNIVERSITY OF NEW JERSEY, New Brunswick, NJ (US)

( * ) Notice: Subject to any disclaimer, the term of this patent is extended or adjusted under 35 U.S.C. 154(b) by 741 days.

(21) Appl. No.: 17/497,221

(22) Filed: Oct. 8, 2021

(65) Prior Publication Data

US 2022/0112340 A1    Apr. 14, 2022

Related U.S. Application Data

(60) Provisional application No. 63/089,892, filed on Oct. 9, 2020.

(51) Int. Cl.

| | | |
|---|---|---|
| C08J 3/20 | (2006.01) | |
| B82Y 30/00 | (2011.01) | |
| B82Y 40/00 | (2011.01) | |
| C01B 32/19 | (2017.01) | |
| C08K 3/04 | (2006.01) | |
| C08K 3/30 | (2006.01) | |

(52) U.S. Cl.
CPC .............. *C08J 3/201* (2013.01); *C01B 32/19* (2017.08); *C08K 3/042* (2017.05); *C08K 3/30* (2013.01); *B82Y 30/00* (2013.01); *B82Y 40/00* (2013.01); *C01B 2204/22* (2013.01); *C08J 2327/16* (2013.01); *C08J 2333/12* (2013.01); *C08J 2381/06* (2013.01); *C08K 2003/3009* (2013.01); *C08K 2201/001* (2013.01); *C08K 2201/011* (2013.01)

(58) Field of Classification Search
CPC .... C08K 3/04; C08K 3/38; C08K 3/30; C08L 33/12; C08L 27/16
See application file for complete search history.

(56) References Cited

U.S. PATENT DOCUMENTS

| | | |
|---|---|---|
| 9,896,565 B2 | 2/2018 | Nosker et al. |
| 10,253,154 B2 | 4/2019 | Nosker et al. |
| 10,329,391 B2 | 6/2019 | Nosker et al. |
| 2012/0301707 A1* | 11/2012 | Kinloch ............... B82Y 30/00 977/734 |
| 2014/0105242 A1* | 4/2014 | Fernandes ............ G01J 5/20 374/185 |
| 2016/0276056 A1* | 9/2016 | Stolyarov ............ C09D 11/38 |
| 2019/0062521 A1 | 2/2019 | Nosker et al. |
| 2019/0233611 A1 | 8/2019 | Nosker et al. |

\* cited by examiner

*Primary Examiner* — Robert T Butcher
(74) *Attorney, Agent, or Firm* — FOX ROTHSCHILD LLP

(57) ABSTRACT

Disclosed are sensor materials and sensors prepared from thermoplastic polymers filled with 2D nanoparticles. The thermoplastic polymers filled with 2D nanoparticles are prepared by a method in which a thermoplastic polymer is melt-blended with at least one layered material under shear sufficient to exfoliate the layered material in the thermoplastic polymer until 2D nanoparticles are formed, to provide covalently linked 2D nanoparticle-filled thermoplastic polymers. Such filled thermoplastic polymers have utility for preparing various types of sensors which are useful in a variety of practical applications and devices.

11 Claims, 10 Drawing Sheets

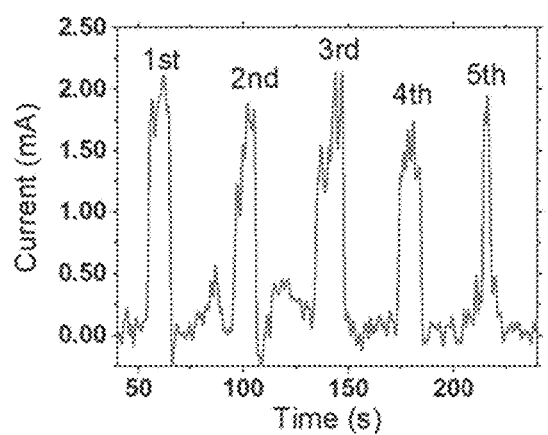 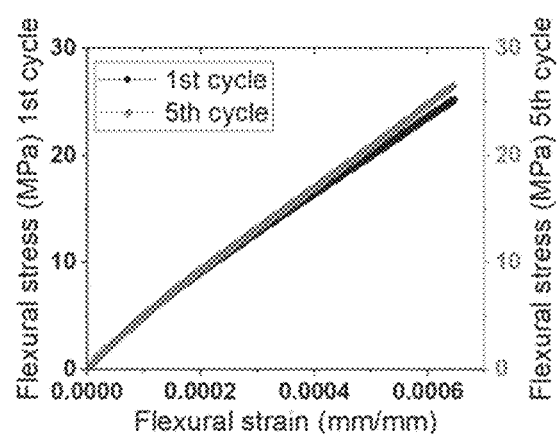
FIG. 5A
FIG. 5B

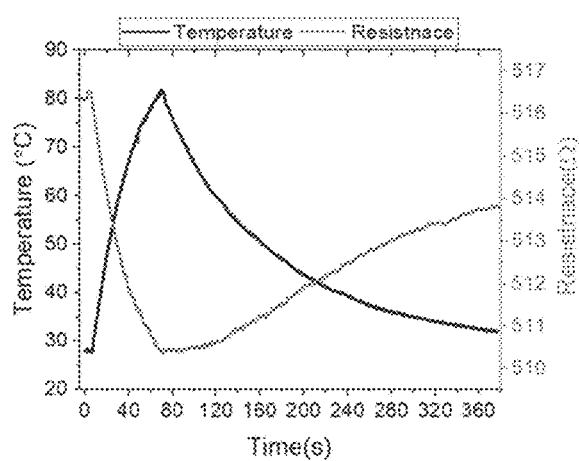
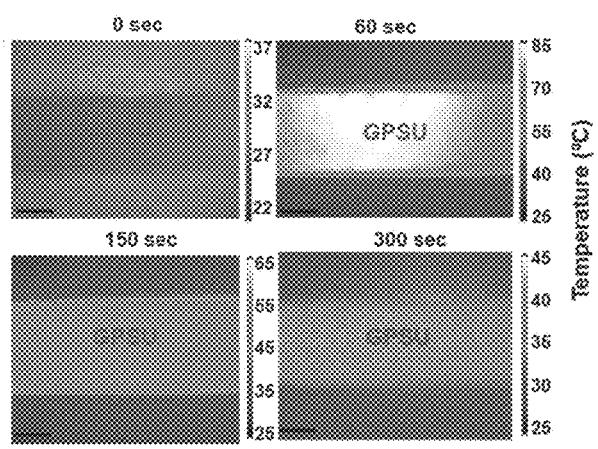
FIG. 7A
FIG. 7B

CONDUCTIVE POLYMER NANOCOMPOSITES ENHANCED WITH IN SITU FORMATION OF 2D NANOPARTICLES FOR STRUCTURAL SENSORS AND SMART MATERIALS

CROSS-REFERENCE TO RELATED APPLICATIONS

This application claims the benefit under 35 U.S.C. § 119(e) of U.S. Provisional Application No. 63/089,892 filed on Oct. 9, 2020, the disclosure of which is incorporated herein by reference in its entirety.

BACKGROUND

Multifunctional flexible sensors are gaining increasing importance these days due to applications in automotive, aerospace, bio and structural health, marine, and energy sectors. Strain sensors can be made from different materials such as metals, and polymers with different fillers. Metal strain sensors are becoming unpopular due to their low stretchability and heavy weight. Polymers, being intrinsically poor in electrical and thermal conductivity, need conductive fillers to enhance those properties for sensing applications.

Among different conductive fillers, graphene (single, few, and multi-layer) and exfoliated graphite are of great interest due to their exceptional mechanical properties, thermal and electrical conductivities, stability and large surface area. This class of graphene enhanced thermoplastic polymer matrix composite, henceforth referred to as G-PMC, depends on unique properties of both graphene/graphite and the polymer in order to sense its environment. Under external load, the distance between graphene units in the composite as well as the structure of the hexagonal honeycomb will undergo change, resulting in a change in resistance of the composite sensor. Electrons tunnel or hop from one graphene unit to another (if the filler content is above the percolation threshold in the composite), which is why the change in distance between graphene units changes the resistance to electron flow.

Polysulfone is a thermoplastic that contains characteristic aryl groups connected by sulfonyl and ether groups. This type of polymer possesses high strength, high service temperature, good electrical characteristics and resistance to different solvents, making it an ideal candidate for sensor applications even in harsh environments. Polysulfone with different conductive fillers and in combination with different metals, has been used as a humidity sensor, gas sensor, strain sensor and biosensor. However, the nanofillers that provide excellent functionalities to the composite are expensive and make the resultant sensor economically less attractive.

Methods utilized to produce and isolate graphene are multi-step, expensive and have the potential to include impurities during fabrication and transfer to target polymer matrix. Moreover, mixing of defect-free and inert pristine graphene with polymers is typically inhomogeneous and can lead to agglomeration of graphene in the matrix. Among these methods, melt processing shows the most potential for commercialization, however, with certain limitations including poor dispersion, and material degradation. Such limitations hinder commercialization of G-PMC sensors.

Graphene-reinforced polymer matrix composites (G-PMC) have been disclosed that are formed by combining graphite and a thermoplastic polymer in a melt-processing method that applies a succession of shear strain events to the molten polymer phase, which exfoliates the graphite into graphene nanoflakes (GNFs) and distributes the GNFS uniformly within the polymer matrix. Relevant US patents and published patent applications teaching how to make and use G-PMCs include, but are not limited to, U.S. Pat. No. 9,896,565; US 2019-0062521; U.S. Pat. No. 10,253,154; US 2019-0233611; and U.S. Pat. No. 10,329,391, the disclosures of which are incorporated herein by reference. Thus, the GNFs are created in situ with the polymer, with the opportunity for in situ functionalization between the GNFs and polymer, because reactive GNF edges are created when fracture occurs across the graphene basal plane. These G-PMCs offer enhanced mechanical properties for structural applications.

SUMMARY OF THE DISCLOSURE

Layered materials (e.g., graphite, molybdenum disulfide, tungsten disulfide, hexagonal boron nitride, etc.) are converted to 2D nanoparticles directly within thermoplastic polymer, rather than having to first separate the nanoparticles from the layered material and then incorporate the nanoparticles into the polymer phase. Contrary to the relevant state of the art, the requirements to first create nanoparticles and functionalize the nanoparticles, which are costly processes, and then subsequently handle the nanoparticles during composite preparation are avoided. Further, superior planar adhesion and primary edge covalent bonding is achieved between newly created 2D nanoparticles and matrix. Graphite is exfoliated into GNFs directly within polymers, providing the opportunity for very strong nanoparticle-polymer interaction, since each new GNF is a pristine surface and fracture across the AB (basal) plane provides the opportunity for primary covalent bonding to occur between GNF edges and polymer. Because exfoliation occurs in situ within polymers, GNFs incur fewer defects versus other standard exfoliation processes that create graphene. Additionally, since the raw materials are layered materials rather than 2D nanoparticles, this sensor material is less expensive to produce and high 2D nanoparticle concentration is easily attained. These G-PMC sensors are easily tunable in order to attain the desired property by controlling the thermoplastic matrix, graphite concentration, and with the addition and exfoliation of insulating layered materials to help focus electron conductivity.

Provided herein are thermoplastics enhanced with 2D nanoparticles, and methods of their formation whereby the nanoparticles are created by the application of shear to layered materials and subsequent exfoliation of the layers occurs directly within the polymer, whereby the resulting polymer nanocomposites possess beneficial electromechanical and thermal properties. Thus, a layered material (or combination of layered materials), such as graphite, hexagonal boron nitride (HBN), molybdenum disulfide ($MoS_2$), tungsten disulfide ($WS_2$), is combined with the polymer and melt-processed with a machine that imparts uniform, high shear in order to exfoliate the layers from the layered materials and provide 2D nanoparticles (with a distribution in the number of layers) well-distributed within the polymer. In situ exfoliation of graphite alone, or in combination with another layered material, produces a graphene nanoflake (GNF) enhanced polymer matrix composite (G-PMC) with improved mechanical, electrical, and thermal properties. These rigid, conductive polymer nanocomposites have various commercial applications, including sensors for infrastructure, automotive, or aerospace applications, and smart materials.

One aspect of the invention is directed to a method of fabricating a sensor material, comprising attaching or inserting a thermoplastic polymer filled with 2D nanoparticles to/into a structure, where the thermoplastic polymer filled with 2D nanoparticles is prepared by a method comprising the steps of a) providing a thermoplastic polymer; and b) blending the thermoplastic polymer and at least one layered material under shear sufficient to exfoliate the layered material in the thermoplastic polymer until 2D nanoparticles are formed, to provide covalently linked 2D nanoparticle-filled thermoplastic polymer. The structure can comprise plastic, metal, wood, etc., or alternatively, can be made from, or partially made from the filled thermoplastic polymer itself. The layered material can be selected from the group consisting of graphite, hexagonal boron nitride (HBN), molybdenum disulfide ($MoS_2$), tungsten disulfide ($WS_2$) and mixtures of two or more thereof. Preferably the layered material is graphite. Alternatively the layered material can be a combination of graphite and another layered material. A preferred combination of layered materials is graphite and $MoS_2$.

The thermoplastic polymer of the method can be a polysulfone or poly(methyl methacrylate) (PMMA) or polyvinylidene fluoride (PVDF).

Another aspect of the invention is directed to a sensor prepared by the above method.

BRIEF DESCRIPTION OF THE DRAWINGS

FIG. 1A, Strain sensor; FIG. 1B, Temperature sensor.

FIG. 2A, Conductivity as a function of voltage for 20G-PSU (bottom curve) and 40G-PSU (top curve); FIG. 2B, conductivity measurement setup; FIG. 2C, flexural stress-strain curve of PSU and G-PSU samples; FIG. 2D, impact strength of G-PSU samples.

FIG. 3A, 10 μm; FIG. 3B, 5 μm; FIG. 3C, 2 μm; FIG. 3D, 1 μm.

FIG. 4A, Raman spectrum of 40 wt. % G-PSU; FIG. 4B, Thermogravimetric analysis (TGA) of 35 wt. % G-PSU.

FIGS. 5A and 5B. FIG. 5A, Sensor characterization of 35 wt % G-PSU showing current as a function of time; and FIG. 5B, corresponding flexural stress versus strain during loading to ca. 25 N (5 times).

FIG. 6A, Manual cyclic loading of 40 wt. % G-PSU sample undergoing 50 cycles of 10 N and then 20 N load during the same test. Due to manual loading, the time between each cycle was not controlled. FIG. 6B, experimental setup used for cyclic loading test, including electrical contacts.

FIGS. 7A and 7B. FIG. 7A, Plots showing change in temperature with time during heating and recovery (bottom curve) and corresponding electrical resistance change (top curve); FIG. 7B, Corresponding thermal images captured during the test.

FIG. 8A, Plots showing change in temperature with time during cooling and recovery (bottom curve) and corresponding electrical resistance change (top curve); FIG. 8B, Corresponding thermal images captured during the test.

FIG. 9A, Hysteresis of G-PSU sensor during heating; and FIG. 9B, cooling.

DETAILED DESCRIPTION

Figure 1A:
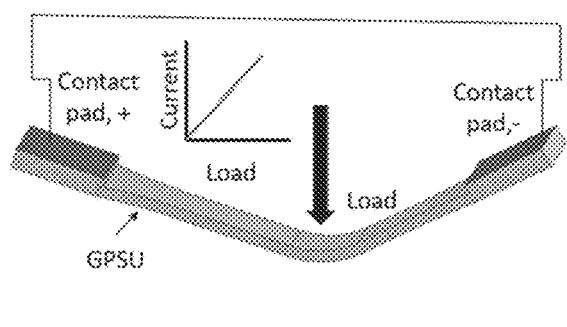
FIGS. 1A and 1B. Schematic diagrams representing a multifunctional G-PSU sensor.
Figure 1B:
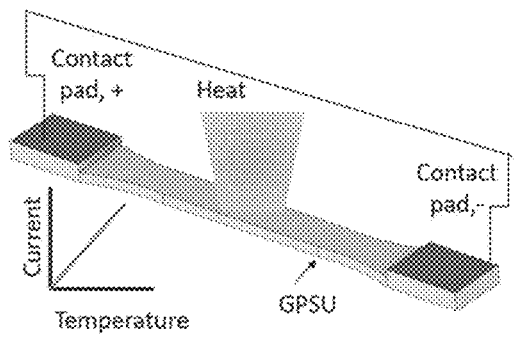

In situ exfoliation of graphite and other layered materials has now been utilized to create conductive thermoplastic polymer matrix nanocomposites enhanced with 2D nanoparticles, which nanocomposites are suitable for applications including sensors, such as structural sensors and heat sensors, and smart materials.

In the presently disclosed method, a layered material has been combined with a thermoplastic polymer and exfoliated directly within the molten polymer, whereby the layered material is subject to uniform, high shear stresses that separate the layers to create 2D nanoparticles (with various numbers of layers in the c-axis direction), thus forming a conductive polymer nanocomposite enhanced with 2D nanoparticles having improved mechanical, electrical, and thermal properties with regard to the nanocomposites' utility in fabricating sensors and smart materials. A further enhancement includes exfoliating graphite plus another layered material into 2D nanoparticles, simultaneously or sequentially, directly within a molten thermoplastic polymer in order to create insulating areas due to a non-conductive 2D nanoparticle that helps to focus electron conductivity along a conductive path provided by 2D GNF particles. It is particularly advantageous to simultaneously exfoliate two or more layered materials in a molten thermoplastic polymer.

One aspect of the invention is directed to a method of fabricating a sensor material, comprising attaching a thermoplastic polymer filled with 2D nanoparticles to a structure, or inserting a thermoplastic polymer filled with 2D nanoparticles into a structure, where the thermoplastic polymer filled with 2D nanoparticles is prepared by a method comprising the steps of a) providing a thermoplastic polymer; and b) melt-blending the thermoplastic polymer and at least one layered material under shear sufficient to exfoliate the layered material in the thermoplastic polymer until 2D nanoparticles are formed, to provide a covalently linked 2D nanoparticle-filled thermoplastic polymer. In this way, the 2D nanoparticles are covalently linked to the polymer.

Another aspect of the invention is directed to a method of fabricating a sensor material, comprising a) preparing a thermoplastic polymer filled with 2D nanoparticles by a method comprising the steps of i) providing a thermoplastic polymer; and ii) melt-blending the thermoplastic polymer and at least one layered material under shear sufficient to exfoliate the layered material in the thermoplastic polymer until 2D nanoparticles are formed, to provide a covalently linked 2D nanoparticle-filled thermoplastic polymer; and b) attaching the filled thermoplastic polymer to a structure, or inserting the filled thermoplastic polymer into a structure, for measurement of strain and/or thermal properties; or c) forming the filled thermoplastic polymer into a structure for measurement of strain and/or thermal properties.

In one embodiment of the method, the layered material is selected from the group consisting of graphite, hexagonal boron nitride (HBN), molybdenum disulfide ($MoS_2$), tungsten disulfide ($WS_2$) and mixtures of two or more thereof. In another embodiment the layered material is graphite. In a further embodiment the layered material is a combination of graphite and another layered material. For example, the layered material can be a combination of graphite and molybdenum disulfide ($MoS_2$).

In one embodiment of the method, the thermoplastic polymer is a polysulfone, poly(methyl methacrylate) (PMMA), or polyvinylidene fluoride (PVDF). In one embodiment the thermoplastic polymer is a polysulfone. In another embodiment the thermoplastic polymer is PMMA. In yet another embodiment the thermoplastic polymer is PVDF.

The method can further comprise attaching electrical contacts to, or inserting electrical contacts into, the above covalently linked 2D nanoparticle-filled thermoplastic polymer.

Another aspect of the invention is directed to a sensor material prepared by the above method. In one embodiment, the sensor further comprises electrical contacts. In one embodiment the sensor is a thermal sensor. In another embodiment the sensor is a strain sensor.

The sensor material can be a structural member and sensor simultaneously; alternatively the sensor material can be affixed or attached to the surface of a structure or device, or inserted into the structure or device, and acts as a sensor only. Thus, in one embodiment the sensor material is attached or affixed to the surface of the structure or device; for example, with a layer of an appropriate adhesive. In another embodiment the sensor material is inserted into the structure or device itself. In yet another embodiment the sensor material is, or is formed into, the structural member itself, or part of the structural member.

EXAMPLES

The following examples are intended to be illustrative of the present invention, and in no way limit its scope.

Materials and Methods

Mined graphite purchased from Asbury graphite (mills grade 3627 with 99.2% purity) with average particle diameter ranging from 250 to 300 μm Graphite (Asbury Graphite, NJ) was combined with polysulfone (UDEL® 1700, Solvay) to make G-PSU. Graphite loading was 20-40 wt %, and samples were exfoliated directly within the molten polymer under sufficient shear stress so that the layered material is subject to uniform, high shear stresses that separate the graphite layers into graphene nanoflakes (GNFs) having various number of layers in the c-axis direction, thus forming a G-PSU nanocomposite. Graphite and PEEK were dry-blended in weight concentrations from 20.40 wt % graphite in PSU in two 500-g batch sizes to help distribute the graphite amongst PSU pellets and added to the hopper of the modified injection molding machine with a unique screw design. ASTM D638 Type 1 tensile specimens were produced with dimensions of 3.4 mm by 12.5 mm by 165 mm and gauge length of 70 mm under a nitrogen blanket at 320 RPM.

Electrical conductivity of G-PSU samples with 20 and 40 wt % graphite exfoliated into GNFs within PSU (20G-PSU and 40G-PSU) was determined using a Keithley 2450 source measure unit, according to ASTM standard D4496-13. Electric current at different potentials was measured for 20G-PSU and 40G-PSU samples (5 specimens per sample were tested) up to 20 volts potential, in order avoid structural damage from high current. Morphology of cold fractured surfaces was viewed using a Zeiss field emission scanning electron microscopy (SEM). Raman data was collected with a 633 nm laser using a ReniShaw inVia reflex system with 50X magnification. Thermogravimetric analysis (TGA) was performed on a Q5000 instrument (TA Instruments, USA) under a nitrogen atmosphere, up to 1000° C. with a ramp rate of 5° C./min.

The sensor capability of G-PSU samples was tested by cyclically loading and unloading specimens in 3-point flexural loading using an Instron 5982 universal testing system while simultaneously monitoring current as a function of time under a potential of 10 volts using a Keithley 2450 source measure unit. Specimens (conforming to ASTM D 638 Type I) were loaded to a maximum stress of 25 N over five cycles, while remaining within the elastic region for these composites. Prior to the test initiation, specimens were preloaded to 10 N at a loading rate of 2.5 mm/sec, followed by the test loading rate of 1 mm/min to reach 25 N. Between loading cycles, specimens were manually unloaded, and force zeroed, which took approximately 25 seconds each time. Cyclic loading testing of 40G-PSU samples was performed over 50 cycles at a 10 N load followed by 50 cycles at a 20 N load. Samples were manually loaded and unloaded.

GNFs enhanced thermal conductivity of polymer matrices, which enabled these materials to be used as temperature sensors. Thus, 40G-PSU was subject to heating with a heat gun up to 80° C. and cooling down to 10° C. by evaporating liquid nitrogen under the sample while monitoring the temperature with a thermal imager (RSE600, Fluke Corporation) and the change in resistance using Keithley 2450 source measure unit under a voltage potential of 10 V.

Example 1: GNF Enhanced Polysulfone (G-PSU) Sensors Over 5 Loading Cycles

Using the above-described method, 20-40 wt % graphite was converted into GNFs directly within polysulfone (PSU) using in situ shear exfoliation, resulting in G-PSU nanocomposites with enhanced electromechanical behavior. Other polymers disclosed in the above-referenced US patents and published applications can be used with or instead of the PSU, such as PMMA or PVDF. Electrical conductivity of G-PSU samples with 20 and 40 wt % graphite exfoliated into GNFs within PSU (20G-PSU and 40G-PSU) was determined using a Keithley 2450 source measure unit, according to ASTM standard D4496-13. Electric current at different potentials was measured for 20G-PSU and 40G-PSU samples (5 specimens per sample were tested) up to 20 volts potential, in order avoid structural damage from high current. Conductivity as a function of voltage for 20G-PSU and 40G-PSU is presented in FIG. 2.

Figure 2A:
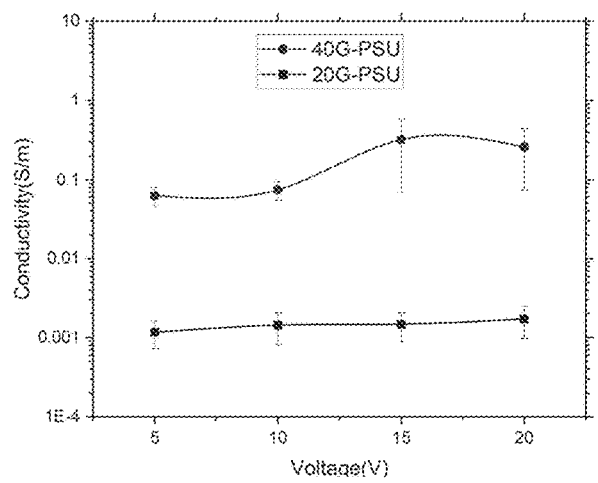
FIGS. 2A, 2B, 2C and 2D.
Figure 2B:
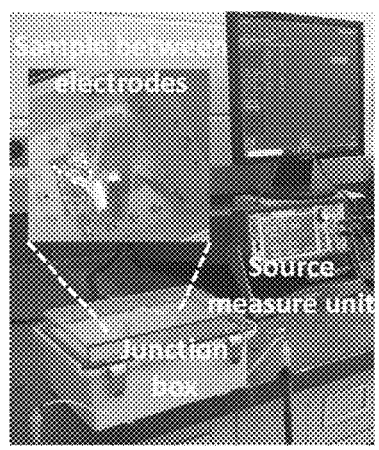

FIGS. 2A and 2B show the effect of GNF filler amount on G-PSU electrical conductivity and the experimental setup used for the measurement (according to ASTM standard D4496-13) respectively. As GNF filler loading increased from 20 to 40 wt %, the electrical conductivity increases by at least two orders of magnitude (from 0.001 S/m to 0.1-1 S/m). This is significant improvement considering the fact that published work with reduced graphene oxide-polysulfone composite showed no measurable conductivity (the graphene formed isolated clusters without interaction with polymer) and a pure carbon nanotube (7 wt %)-polysulfone based composite showed conductivity ca. 1 S/m. In contrast, the present filler is graphite, which is at least 10 times cheaper than either graphene or carbon nanotubes. Additionally, the present technique does not require any functionalization of the fillers for uniform dispersion in the polymer matrix, thus enabling further savings of time and cost.

Figure 2C:
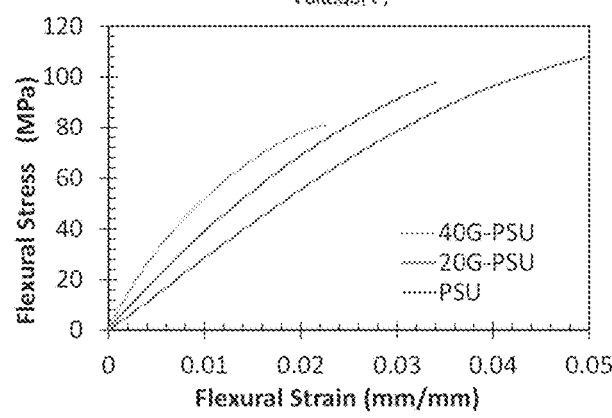
Figure 2D:
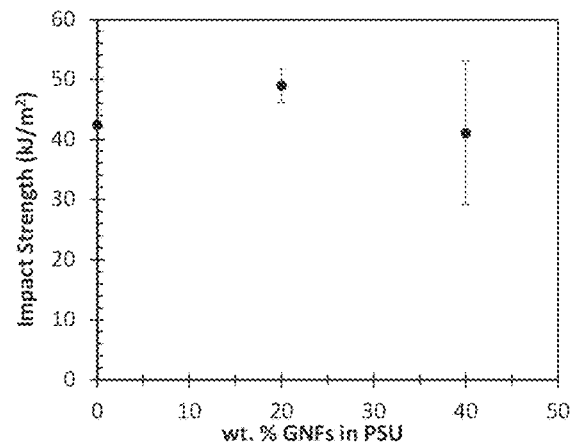
Figures 3A, 3B, 3C, 3D:
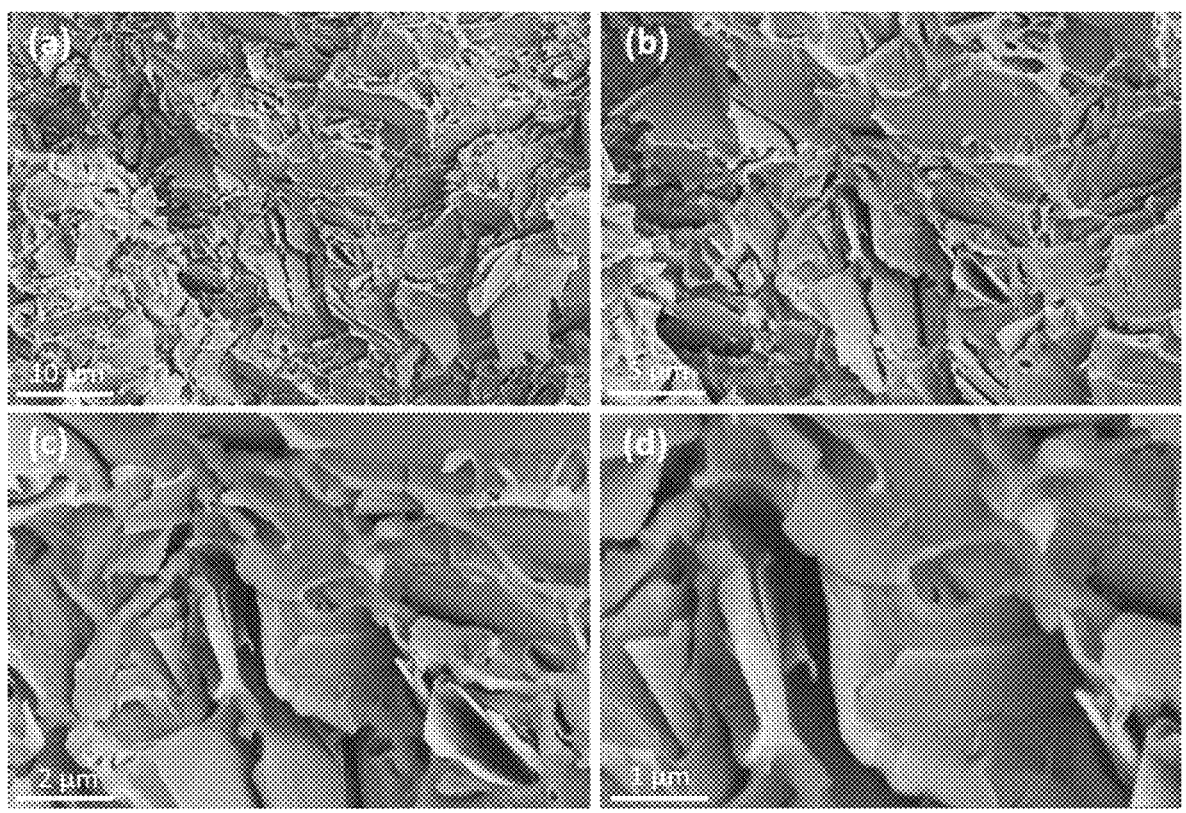
FIGS. 3A, 3B, 3C and 3D. SEM images showing morphology of 40 wt. % G-PSU at different magnifications.
Figure 4A:
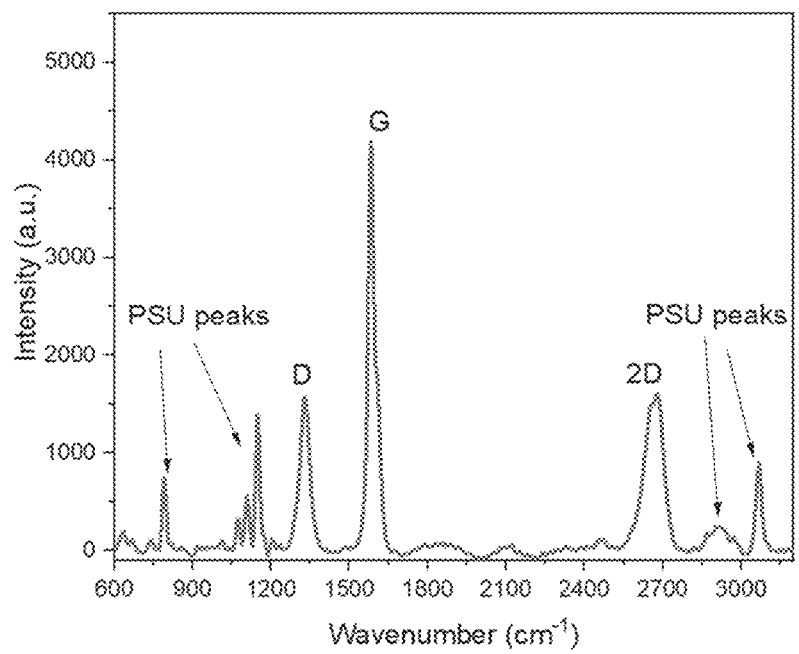
FIGS. 4A and 4B.
Figure 4B:
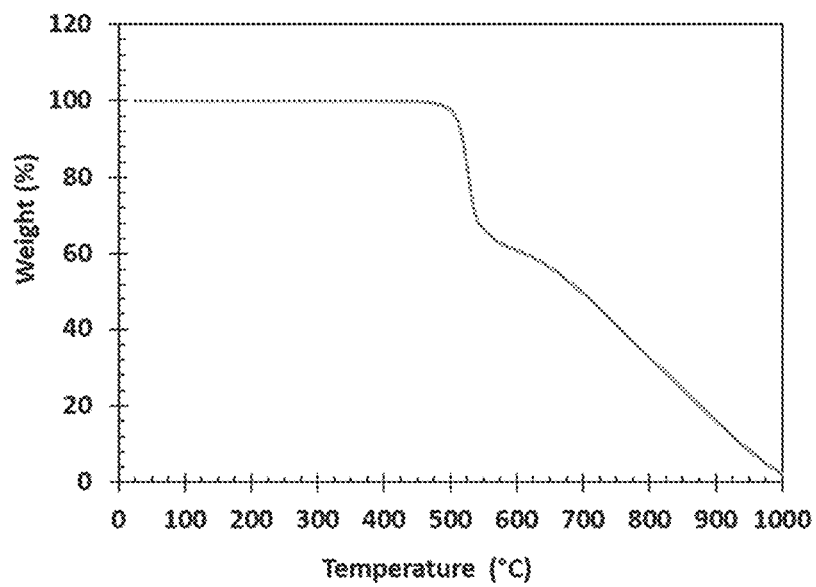

FIGS. 2C and 2D show the results from flexural and impact testing respectively. Nanofillers result in reduction of modulus, but the strength of the composite is similar to that of the pure polymer. Since the polymer structure is not degraded due to nanofillers and does not result in premature failure under flexural or impact loading, the nanocomposite itself can be used for structural strain sensing with a wide loading range. FIG. 3 shows the SEM images of 40 wt % G-PSU samples at different magnification. From these SEM images, the GNFs are observed to be uniformly distributed in the polymer matrix. No filler agglomeration was observed from the SEM images. The original graphite particle diameter was ca. 300 µm, however, the GNF size from SEM is observed to be ca. 10 µm, indicating shear induced fracture along the basal plane, creating more edge sites that can form bonds with surrounding polymer molecules. The conformal coating of the GNFs by polymer indicates strong interfacial adhesion between them (FIG. 3D). Raman spectrum of 40 wt. % G-PSU is presented in FIG. 4A. Typical peaks associated with graphene can be observed at ca. 1350 cm-1 for D band, ca. 1580 cm-1 for G band, ca. 1650 cm-1 for D' band and ca. 2680 cm-1 for 2D band. The intensity ratio of 2D and G band (l(2d/G)) is ca. 0.4-0.5, representing GNFs with less than 10 layers. Additionally, l(D/G) ratio is high (>0.4), indicating covalent bond formation between GNF and polymer. FIG. 4B shows the TGA plot of 35 wt % G-PSU. Even though the onset degradation temperature is similar, temperatures corresponding to 60% and less weight loss is higher than PSU, indicating resistance to thermal transfer by GNFs and strong bonding between GNF and polymer matrix.

The sensor capability of 35G-PSU samples was tested by cyclically loading and unloading specimens in 3-point flexural loading using an Instron 5982 universal testing system while simultaneously monitoring current as a function of time under a potential of 10 volts using a Keithley 2450 source measure unit (FIG. 5). Specimens (ASTM D 638 Type I) were loaded to a maximum stress of 25 N over five cycles, while remaining within the elastic region for these composites. Prior to the test start, specimens were preloaded to 10 N at a loading rate of 2.5 mm/sec, followed by the test loading rate of 1 mm/min to reach 25 N. Between loading cycles, specimens were manually unloaded and force zeroed, which took approximately 25 seconds each time.

FIGS. 5A and 5B show the strain sensing performance of a 35 wt. % G-PSU composite when loaded within the elastic regime (ca. 25 MPa or ca. 25 N loading) (FIG. 2C). The change in current flowing through the sample under load was linear and rapid (within seconds; FIG. 5A). During multiple loading of the same sample, the change in current and strain induced in the sample were similar, indicating repeatable behavior. Under external load, distance between graphene in the composite and the structure of hexagonal honeycomb will undergo change, resulting in change in resistance and therefore, current flow through the composite sensor. Electrons tunnel or hop from one graphene flake to another (if the filler content is above the percolation threshold in the composite), which is why the change in distance between graphene flakes changes the resistance to electron flow.

Example 2: GNF Enhanced Polysulfone (40G-PSU) Sensors Over 50 Loading Cycles

Cyclic loading testing of 40G-PSU samples over 50 cycles at a 10 N load followed by 50 cycles at a 20 N load (FIG. 6). Samples were manually loaded. Results showed consistent amplitude of resistance change for 50 cycles at 10 N load and at 20 N load with slight variation due to manual loading technique, indicating the durability of the 40G-PSU sensor during a long service life.

Figures 6A, 6B:
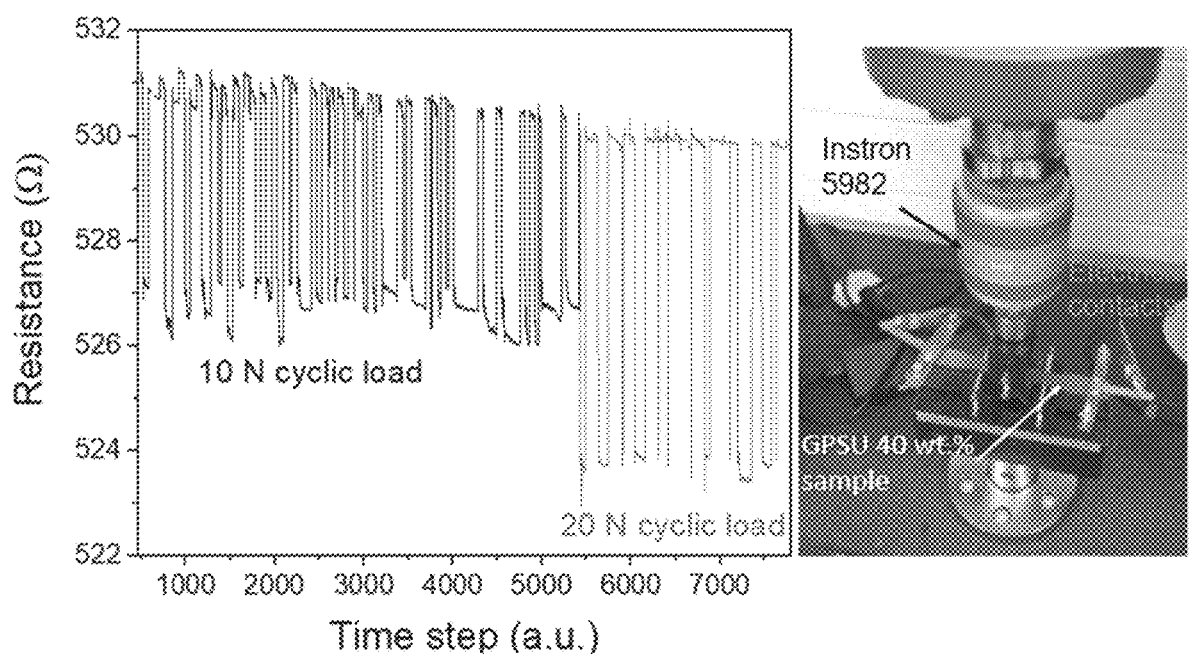
FIGS. 6A and 6B.

To determine the repeatability of the sensor performance, 40 wt. % G-PSU sample was subjected 50 times to 10 and 20 N load (within elastic regime). FIG. 6A shows a portion of the test results and FIG. 68 shows the experimental setup for this test. An ASTM D 638 Type I sample with silver paint contact pads and copper electrode was subjected to cyclic loads manually by an operator (FIG. 6B). Results showed consistent amplitude of resistance change for 50 cycles at 10 N load and at 20 N load with slight variation due to the manual loading technique, indicating the durability of the 40 G-PSU sensor during a long service life. The sensor showed reversible and self-sensing behavior, which is a characteristic advantage of 2D nanofillers (e.g. graphene) vs. a 1D nanofiller (e.g. carbon nanotubes, CNTs). The gauge factor (percentage change in resistance vs change in strain) for the cyclic testing with 20 N load was found to be 27. This is significantly higher compared to a CNT-polysulfone strain sensor, and comparable to other reported graphene nanocomposite sensors.

Example 3: GNF-Enhanced Polysulfone (40G-PSU) as a Temperature Sensor

40G-PSU was subject to heating with a heat gun up to 80° C. and cooling down to 10° C. by evaporating liquid nitrogen under the sample while monitoring with a thermal imager and the Keithley 2450 source measure unit. The resistance and temperature change with time, as well as thermal images are presented for 40G-PSU during heating and cooling in FIG. 7 and FIG. 8, respectively. Results showed there is continuous change in resistance with temperature rise and fall during heating with a heat gun and cooling with evaporating liquid nitrogen. After the heating and cooling stop, the resistance recovers at the same rate as the temperature, indicating no hysteresis. Further, the sensor was tested from ca. 10° C. to 80° C., indicating wide applicability as a temperature sensor in different weather conditions. Utility of the sensor under different temperature regimes and/or harsh conditions (such as corrosive environments) is expected to be superior.

Figure 8A:
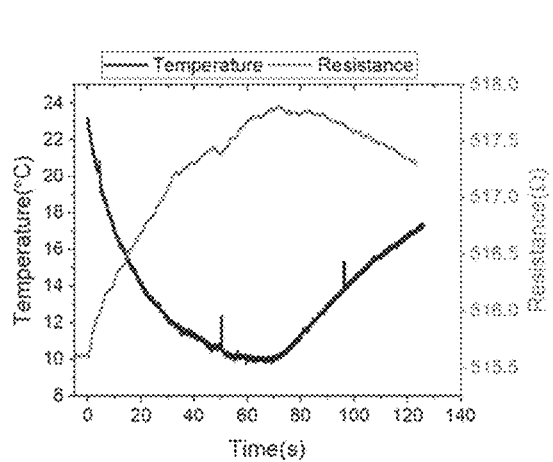
FIGS. 8A and 8B.
Figure 8B:
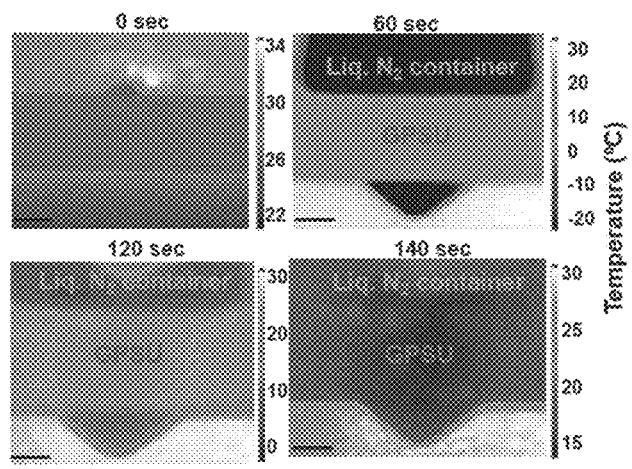
Figure 9A:
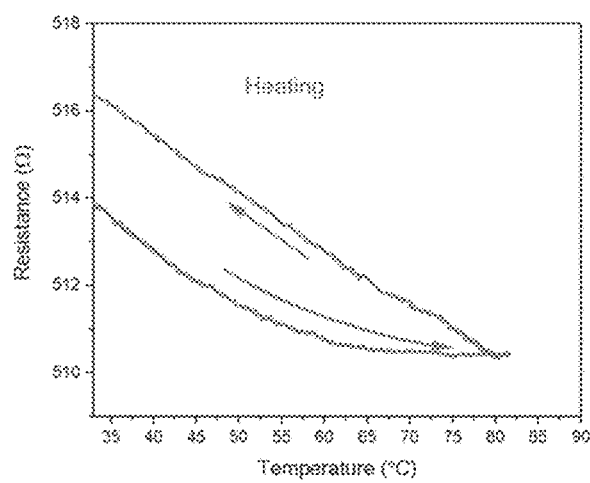
FIGS. 9A and 9B.
Figure 9B:
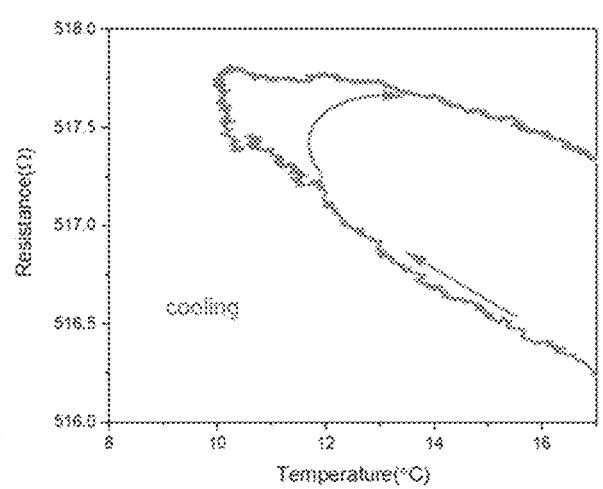

The resistance and temperature change with time, as well as thermal images are presented for 40G-PSU during heating and cooling in FIG. 7 and FIG. 8, respectively. Results shown there are consistent with change in resistance with temperature rise and fall during heating with a heat gun and cooling with evaporating liquid nitrogen. The sensor was tested from ca. 10° C. to 80° C., indicating wide applicability as a temperature sensor in different weather conditions. After the heating and cooling stop, the resistance recovers almost at the same rate as the temperature, indicating minimal hysteresis (FIG. 9). The hysteresis (difference in resistance change at the same temperature during heating and subsequent cooling) can be as high as ca. 20%, whereas in the present case it was only 0.42%. Thermal images (from thermal video recording during the entire test) showed a uniform temperature profile across the sample area being heated, indicating uniform dispersion of the nanofillers in the polymer composite (FIGS. 7B and 8B).

Example 4: Combination of Graphite and Other Layered Materials to Focus the Electrically Conductive Path (GNF-MoS$_2$-PMMA)

The conductivity of these novel G-PMCs can be enhanced further with the simultaneous (or sequential) addition and subsequent exfoliation of other layered materials that help focus the conductive path for electrons along the GNFs. The present method can incorporate a combination of layered materials followed by exfoliation into 2D nanoparticles directly within the selected polymer in order to tune the conductive or insulating properties. For example, 20 wt. % graphite and 20 wt. % Molybdenum Disulfide ($MoS_2$) were combined with polymethylmethacrylate (PMMA) using the high shear batch mixer in order to exfoliate both layered materials simultaneously, resulting in a focused conductive path for electrons to flow along the created GNFs rather than the created $MoS_2$ nanoparticles. The morphology of GNF-$Mos_2$-PMMA samples showed $MoS_2$ as triangular-shaped particles and GNFs as larger sheets (data not presented). The Raman map of the same composite was obtained using 532 nm laser in a ReniShaw inVia reflex system with 50× magnification, one micrometer probe size, and the Raman data was deconvoluted using Wire 4.2 and RamanToolSet software (from NIST). Raman mapping indicated good mixing of both $MoS_2$ and GNF nanoparticles (data not shown).

Since G-PSU is stable up to 500° C. (FIG. 4B), the potential of the sensor at different temperature regimes and harsh conditions (such as corrosive environments) is expected to be exceptional. Polysulfone is already a widely acceptable material used in automotive industry (such as steering column lock switches, relay insulators, and pistons) and in medical equipment (nebulizers and dialysis components). Therefore, G-PSU, with its excellent temperature sensing property, can be a suitable strain and temperature sensor for the automotive, medical, and aerospace industries. Additionally, the nanocomposite's good electrical properties, thermal properties and chemical stability makes it an economically viable material for molded interconnect devices for consumer electronic, telecommunication, automotive, and medical technologies as well as lightweight structural parts for collaborative robots (Cobots).

Thus, by in-situ exfoliation of graphite into graphene in a polysulfone matrix using the presently disclosed method, one can fabricate a multifunctional material especially suitable for strain and temperature sensing due to enhancement of PSU electrical and thermal properties. G-PSU nanocomposite with 35-40% filler loading was able to detect strain in the elastic regime with a gauge factor of 27 with minimal hysteresis for 50 cycles. As a temperature sensor, the nanocomposite was able to detect temperature in the range of 10-80° C. with a temperature coefficient of resistance value of 0.0003° $C.^{-1}$ and minimal hysteresis.

Example 5: Graphene Enhanced Polyvinylidene Fluoride (PVDF)

Polyvinylidene fluoride (PVDF), is a semi-crystalline thermoplastic polymer with favorable characteristics such as low cost, good mechanical properties, resistance to chemicals, thermal stability, and unique pyroelectric and piezoelectric properties. PVDF is a long chain of the repeating unit $(CH_2CF_2)_n$ with approximately 55% crystallinity, exhibiting at least four crystalline phases, known as α, β, γ, and δ. The common phases are α, β, and γ, with the α-phase being the most common, occurring naturally during cooling from a melted state; however, the α-phase is the most desirable, because spontaneous polarization can occur, and the β-phase has the highest ferro- and piezoelectric properties. Traditionally, the β-phase has been obtained via stretching and/or submitting to high pressures.

Mined graphite purchased from Asbury graphite (mills grade 3627 with 99.2% purity) with average diameter ranging from 250 to 300 μm Graphite (Asbury Graphite, NJ) was combined with PVDF (Kynar 720 pellets, Arkema) to make G-PVDF nanocomposites. This grade of PVDF is reported to have a specific gravity of 1.77-1.79, melting temperature of 165-172° C., and tensile strength of 34-55 MPa by the manufacturer. Both materials were conditioned prior to use to remove volatiles. The PVDF was held under vacuum for at least 4 hours prior to processing. Graphite was dried in a convection oven overnight (approximately 12 hours) at 185° C. Graphite loading was 0, 5, 10, 20, and 30 wt. %, and the graphite was exfoliated directly within the molten polymer under sufficient shear stress so that the layered material was subject to uniform, high shear stresses that separated the graphite layers to graphene nanoflakes (GNFs) having various numbers of layers in the c-axis direction, thus forming a G-PVDF nanocomposite.

Thus, PVDF and graphite flakes were added to a Randcastle microbatch mixer that imparts elongational flow, folding, and uniform shear to exfoliate graphite into GNFs within the PVDF. Starve-feeding was utilized to load PVDF, followed by loading the proper graphite concentration, and the components were mixed under a nitrogen environment. The processing temperature was approximately 204° C. The RPM was held constant over a 90-minute mixing time period ranging between 120-200 RPM, depending on concentration, which provided shear rates ranging from 962-1603 1/sec, respectively. The 30 wt. % GNF in PVDF sample was processed at only 15 RPM due to power limitations of the machine. Since the RPM determines the shear rate, higher RPM provides more efficient graphite exfoliation with a subsequent higher degree of graphite exfoliation into GNFs and higher tensile modulus. Thus, only the electrical conductivity and sensor performance is presented for the 30 wt. % GNF in PVDF sample. Machine modifications would be required to allow for more power to optimally process 30 wt. % graphite in PVDF in order to convert graphite into uniform GNFs for this high graphite loaded PVDF.

After melt-mixing to exfoliate graphite into GNFs within the PVDF, the G-PVDF nanocomposites were post processed to fabricate standard tensile specimens (ASTM D 638 size V) and impact specimen (ASTM D256) using a mini-molding machine, and films using compression molding for characterization of morphology via scanning electron microscopy (SEM), tensile properties, volume conductivity, and sensor behavior. Sensor behavior was measured by attaching a film composed of 20 wt. % GNFs in PVDF to a flexural specimen and measuring resistance during flexural cyclic loading.

Morphology

The morphology of 5, 10, 20, and 30 wt. % GNFs in PVDF was examined using SEM to obtain micrographs at low and medium magnification (data not shown). At low magnification (20 μm scale), images showed that GNFs were well distributed within 5, 10, 20, and 30 wt. % GNFs in PVDF. At medium magnification (10 μm scale), the GNFs appeared oriented within the PVDF matrix for 5, 10, and 20 wt. % GNFs in PVDF. The GNFs were aligned parallel to the flow direction. For the 30 wt. % GNFs in PVDF sample, the GNFs varied in size (thickness and diameter) but did show some orientation. This wider distribution in GNF size is due to the lower RPM used during processing, which induced lower shear strain rate and shear stresses resulting in less efficient exfoliation (affecting particle thickness) and reduced occurrence of fracture across the Basal plane (affecting particle diameter). All of the images showed good planar adhesion between GNFs and PVDF, which is necessary for enhanced mechanical properties.

Tensile Properties

Tensile mechanical property characterization was conducted according to ASTM D638 for type 5 specimens using an MTS QTest/25 Elite Controller with an extensometer mounted to the specimen. At least 5 specimens were tested until failure for each composition at a cross head rate of 1 mm/min. The tensile modulus increased linearly with GNF concentration, reaching a maximum of 8.6 GPa at a concentration of 20 wt. % GNFs in PVDF, which is 556.5% higher than PVDF alone (data not shown). This significant increase in modulus is attributed to efficient graphite exfoliation into GNFs that are well-dispersed and uniformly distributed within PVDF, providing efficient stress transfer between GNFs and the matrix upon loading, as shown in the morphology images.

Electrical Properties

Electrical conductivity was measured for 10, 20, and 30 wt. % GNFs in PVDF, according to ASTM D4496. Injection molded impact specimens were segmented along the length to provide three different specimens for testing having dimensions approximately 12.5 mm by 12.5 mm by 3 mm. Electrical conductivity for the three segments from each sample was averaged. The direction of flow during molding was from specimens 1 to 3, resulting in GNF orientation parallel to the direction of flow. The conductivity was measured parallel and orthogonal to the GNF orientation. Two opposing faces were coated with conductive silver paint. A Keithley 2450 Source Measure Unit (SMU) was used to provide a voltage sweep from 0 to 160 V and adjusted to a lower voltage to manage the circuit running through the segment. The volume resistivity and conductivity were calculated using equations [1] and [2] where $\rho_v$ is the volume resistivity, $R_v$ is the resistance from the source unit, A is the cross sectional area of the diode surface, t is the distance between diode surfaces, and $\sigma_v$ is the volume conductivity.

$$\rho_v = R_v \frac{A}{t} \quad [1]$$

$$\sigma_v = \frac{1}{\rho_v} \quad [2]$$

Electrical conductivity correlated directly with GNF orientation, an isotropic property, and GNF concentration. The GNFs are oriented in the parallel to flow direction, and therefore, electrical conductivity is higher in the parallel-to-flow direction than in the orthogonal-to-flow direction.

The 30 wt. % GNFs in PVDF sample showed the highest conductivity, on the order of $10^{-3}$ S/mm, which is comparable to the conductivity of other semiconductors (between silicon and germanium). However, the test was disrupted before reaching 40 V, which may have been due to the lower degree of graphite exfoliation into GNFs during processing (i.e., lower RPMs than for 10 and 20 wt. % GNF in PVDF samples) that resulted in a wide distribution of GNF size and varying distance between GNFs. Processing the 30 wt. % GNF in PVDF sample must be optimized to attain full and consistent results. The 10 and 20 wt. % GNFs in PVDF samples showed similar conductivities on the order of $10^{-7}$ to $10^{-6}$ S/mm, which is within the range of other semiconductors. High electrical conductivity is measured parallel to the GNF orientation, due to GNF orientation, dispersion, and distribution within the matrix. The GNFs are aligned in the parallel to the flow direction, providing a direct path for electron mobility and the current to travel.

The electrical conductivity for 10, 20, and 30 wt. % GNFs in PVDF orthogonal to GNF orientation, as expected, was lower when measured orthogonal to GNF orientation (data not shown). The 30 wt. % GNF in PVDF sample again showed the highest conductivity, on the order of $10^{-5}$ S/mm. The 20 wt. % GNF in PVDF sample showed electrical conductivity on the order of $10^{-8}$ S/mm. The 10 wt. % GNF in PVDF sample showed a gradual increase in conductivity with increasing voltage, showing volume conductivities from $10^{-11}$ and $10^{-9}$ S/mm (data not shown).

Strain Sensor Performance

Sensor capability was tested for 20 wt. % GNFs in PVDF film samples. Films were cut and affixed to a flexural specimen using a two-part silver epoxy. The specimen was loaded in a 3-point bend fixture using an Instron 5982 universal testing system with a 1 kN load cell, simultaneously attached to a Keithley 2450 SMU. The SMU was set to voltage bias at 10 V and a current limit of 1 A, and the specimen was cyclically loaded and unloaded to 20 N over 35 cycles. The cycle time was approximately 1 minute and 30 seconds, including 30 seconds to reach a 20 N load, a 30-second hold at the maximum load, unloading to 0 N, and another 30-second hold at 0 N prior to initiating the next cycle. Two strain sensor specimens were prepared and tested following the same loading/unloading cycle, FIGS. 10A and 10B.

Using equation [3], the resistance was normalized.

$$z_i = \frac{x_1 - \min(x)}{\max(x) - \min(x)} \quad [3]$$

Figure 10A:
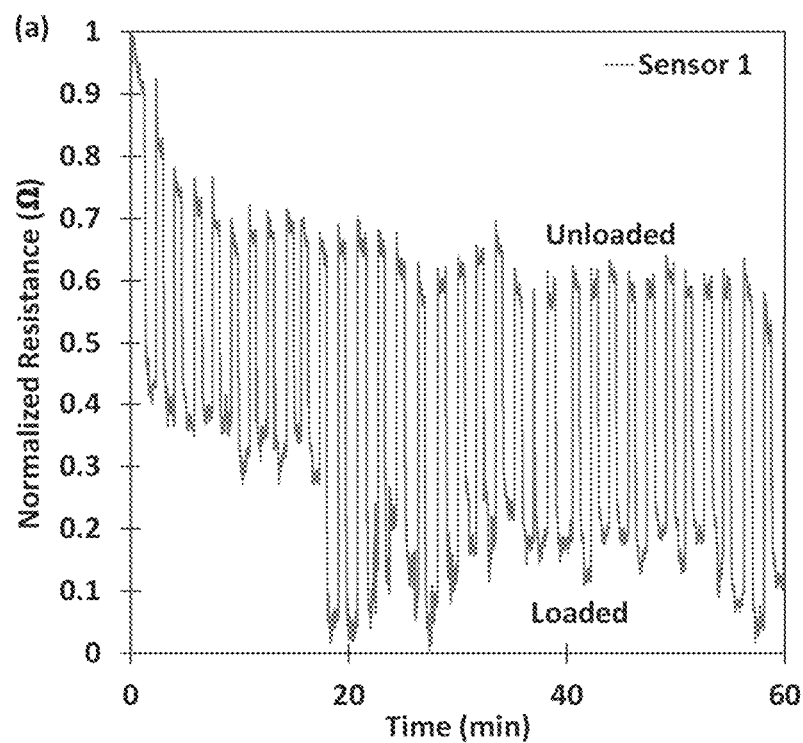
FIGS. 10A and 10B show normalized electrical resistance as a function of time during cyclic loading/unloading measured by a film of G-PVDF sensor material affixed to different samples, FIG. 10A and FIG. 10B, of the same flexural specimen.
Figure 10B:
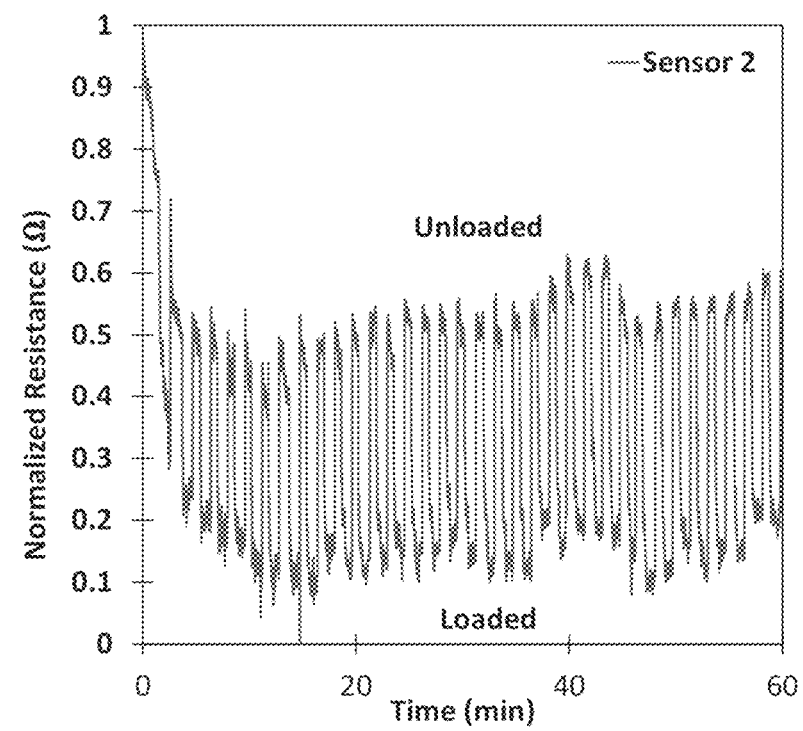

As shown in FIGS. 10A and 10B, the change in resistance followed the 35 loading/unloading cycles, thereby demonstrating the sensor material performance. The mechanically loaded specimen is represented by the peak in the resistance, while the unloaded specimen is represented by the minimum resistance. The change in resistance upon mechanical loading is attributed to the change in distance between GNFs when under tensile strain, as on the bottom surface of the flexural specimen. The flexural specimen can be any material for which a determination of mechanical properties is desired. The mechanical loading is imparted on the flexural specimen, and the G-PVDF sensor material is able to detect this mechanical loading due to the change in resistance upon loading and unloading.

In summary, these GNF enhanced thermoplastics can be used as various types of sensor materials to measure electrical conductivity or resistance, as well as temperature in infrastructure, automotive, aerospace, medical, environmental monitoring, robotics, consumer electronics, telecommunications and other specialty applications.

It will be understood by those of skill in the art that numerous and various modifications can be made without departing from the spirit of the present invention. Therefore, it should be clearly understood that the various embodiments of the present invention described herein are illustrative only, and are not intended to limit the scope of the present invention.

What is claimed is:

1. A method of fabricating a sensor material, comprising:
   a) preparing a thermoplastic polymer filled with 2D nanoparticles by a method comprising the steps of:

i) providing a thermoplastic polymer; and
ii) melt-blending the thermoplastic polymer and at least one layered material comprising graphite under shear sufficient to exfoliate the layered material in the thermoplastic polymer until 2D nanoparticles are formed, to provide a covalently linked 2D nanoparticle-filled thermoplastic polymer, wherein the melt-blend of the thermoplastic polymer and the layered material comprises 20 to 40 wt % graphite, wherein the graphite is sufficiently exfoliated until 10 wt % to 30 wt % 2D nanoparticles are formed that are distributed in an alignment that provides an electrical conductivity between $10^{-8}$ to $10^{-5}$ S/mm;

and b) attaching said filled thermoplastic polymer to a structure, or inserting said filled thermoplastic polymer into a structure, for measurement of strain or thermal properties;

or c) forming said filled thermoplastic polymer into a structure, for measurement of strain or thermal properties.

2. The method of claim 1, wherein the layered material further comprises an additional material selected from the group consisting of hexagonal boron nitride (HBN), molybdenum disulfide ($MoS_2$), tungsten disulfide ($WS_2$) and mixtures thereof.

3. The method of claim 1, wherein the layered material consists of graphite.

4. The method of claim 1, wherein the layered material is a combination of graphite and another layered material.

5. The method of claim 4, wherein the layered material is a combination of graphite and $MoS_2$.

6. The method of claim 1, wherein the thermoplastic polymer is a polysulfone, poly(methyl methacrylate) (PMMA), or polyvinylidene fluoride (PVDF).

7. A sensor material prepared by the method of claim 1.

8. The method of claim 1, further comprising attaching electrical contacts to, or inserting electrical contacts into said covalently linked 2D nanoparticle-filled thermoplastic polymer.

9. A sensor comprising the sensor material of claim 7, and further comprising electrical contacts.

10. The sensor of claim 9, wherein said sensor is a thermal sensor.

11. The sensor of claim 9, wherein said sensor is a strain sensor.

\* \* \* \* \*